United States Patent
Yurgil et al.

(10) Patent No.: US 9,840,977 B1
(45) Date of Patent: Dec. 12, 2017

(54) ENGINE STOP POSITION CONTROL SYSTEM AND METHOD

(71) Applicant: GM Global Technology Operations LLC, Detroit, MI (US)

(72) Inventors: James R. Yurgil, Livonia, MI (US); Gregory J. York, Fenton, MI (US); Eric B. Schutt, Oxford, MI (US); Brian P. Hannon, Jr., White Hall, MD (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/181,075

(22) Filed: Jun. 13, 2016

(51) Int. Cl.
*F02D 41/06* (2006.01)
*F02D 41/04* (2006.01)

(52) U.S. Cl.
CPC ......... *F02D 41/062* (2013.01); *F02D 41/042* (2013.01)

(58) Field of Classification Search
CPC .............. F02D 41/042; F02D 41/062; F02D 2200/0404; F02D 2200/0406; F02D 2200/101; F02D 2200/501; Y02T 10/144; Y02T 10/46; F02N 11/0855
USPC ............. 701/101, 110–114; 123/90.1, 90.17, 123/179.3–179.5, 339.1, 339.19, 398, 123/399, 403, 196 S, 198 DC
See application file for complete search history.

(56) References Cited

U.S. PATENT DOCUMENTS

| | | | |
|---|---|---|---|
| 6,311,118 B1 * | 10/2001 | Ito | B60K 31/047 477/42 |
| 6,453,864 B1 | 9/2002 | Downs et al. | |
| 6,505,594 B1 * | 1/2003 | Katayama | F02D 31/002 123/179.18 |
| 6,647,955 B1 | 11/2003 | Sieber | |
| 7,392,786 B2 * | 7/2008 | Lewis | F01L 13/0005 123/321 |
| 8,141,534 B2 * | 3/2012 | Liu | F02N 11/0855 123/179.4 |
| 8,352,153 B2 * | 1/2013 | Gibson | F02D 13/0261 123/179.4 |
| 8,702,565 B2 | 4/2014 | Abboud et al. | |
| 2009/0055074 A1 * | 2/2009 | Ishiguro | F02D 35/023 701/102 |
| 2010/0174473 A1 * | 7/2010 | Pursifull | F02D 41/042 701/112 |

(Continued)

*Primary Examiner* — John Kwon
*Assistant Examiner* — Johnny H Hoang

(57) ABSTRACT

An engine control system for an auto-stop/start vehicle includes an auto-stop/start module that generates an auto-stop command for shutting down an engine while an ignition is ON and subsequently generates an auto-start command for re-starting the engine. The system includes an actuator control module that disables an engine load, parks exhaust and intake cam phasers, disables fuel, sets a first throttle opening, monitors a crankshaft rotational position, speed, and deceleration, sets a second throttle opening for a predetermined duration if a piston simultaneously crosses a target position below a target engine speed and below a target degrees of rotation remaining, sets a third throttle opening, and determines if an engine speed is below a threshold speed before setting a fourth throttle opening when the engine speed is below the threshold speed, and causes the piston to rest in a predetermined position range.

19 Claims, 4 Drawing Sheets

(56) References Cited

U.S. PATENT DOCUMENTS

| | | | | |
|---|---|---|---|---|
| 2010/0211288 A1* | 8/2010 | Gibson | ................ | F02N 99/006 701/103 |
| 2014/0336910 A1* | 11/2014 | Gibson | .................. | F02N 11/08 701/113 |
| 2015/0369149 A1* | 12/2015 | Matsubara | .......... | F02D 41/0007 701/103 |

* cited by examiner

ENGINE STOP POSITION CONTROL SYSTEM AND METHOD

FIELD

The present invention relates to stop-start control systems for automobile powertrains, and more particularly to systems and methods for managing the engine stop position during a stop-start sequence to improve the overall efficiency of the powertrain.

BACKGROUND

The statements in this section merely provide background information related to the present disclosure and may or may not constitute prior art.

Air is drawn into an engine through an intake manifold. A throttle valve controls airflow into the engine. More specifically, the throttle valve adjusts throttle area, which increases or decreases airflow into the engine. As the throttle area increases, the air flow into the engine increases. A fuel control system adjusts the rate that fuel is injected into the engine cylinders to provide a desired air/fuel mixture to the cylinders and/or to achieve a desired torque output. Increasing the amount of air and fuel provided to the cylinders increases the torque output of the engine.

The air/fuel mixture is combusted within one or more cylinders of the engine. In spark-ignition engines, spark initiates combustion of the air/fuel mixture provided to the cylinders. In compression-ignition engines, compression of the air/fuel mixture in the cylinders combusts the air/fuel mixture. Spark timing and airflow are the primary mechanisms for adjusting the torque output of spark-ignition engines, while fuel flow is the primary mechanism for adjusting the torque output of compression-ignition engines. Incomplete, or partial combustion of the air/fuel mixture during engine start may cause the engine to vibrate.

During engine shutdown, a rotation direction of a crankshaft in the engine may be reversed before the crankshaft stops. In turn, a piston coupled to the crankshaft may stop near top dead center (TDC) before movement of the piston is reversed. This reversal of piston movement during engine shutdown is referred to as rock back. As the piston rocks back, the piston draws exhaust gas into the cylinder in which the piston is disposed. Exhaust gas is also be drawn into an intake manifold of the engine due to a pressure difference between the intake manifold and the cylinders. When the engine is restarted, exhaust gas flows from the intake manifold to the cylinder, and exhaust gas present within the cylinder may cause the cylinder to misfire which in turn may cause the engine and the passenger compartment to vibrate.

An engine control module (ECM) controls the torque output of the engine. Under some circumstances, the ECM shuts down the engine between vehicle startup (e.g., key ON) and vehicle shutdown (e.g., key OFF). The ECM selectively shuts down the engine, for example, to increase fuel efficiency (i.e., reduce fuel consumption). The ECM starts the engine at a later time.

While traditional stop-start systems for internal combustion engines are effective, there is room in the art for an improved stop-start system and method that ensures the appropriate amount of air and fuel are supplied to the cylinders for low-vibration engine start. Especially desirable, would be a stop-start system that performs under a wide variety of ambient conditions while reducing engine start vibration.

SUMMARY

In one embodiment of the present invention, an engine control system for controlling the resting position of at least one piston within a cylinder of an engine of an auto-stop/start vehicle includes an auto-stop/start module that selectively generates an auto-stop command for shutting down an engine while an ignition is in an ON state and that selectively generates an auto-start command for re-starting the engine after the generation of the auto-stop command. The engine control system also includes an actuator control module that, in response to the generation of the auto-stop command and before the generation of the auto-start command: disables a load on the engine, parks exhaust cam phasers and intake cam phasers, disables fuel to the engine, sets a throttle valve opening to a first predetermined throttle opening level, monitors a crankshaft rotational position, determines if a position of a piston is entering a predetermined position based on the crankshaft rotational position, monitors an engine speed, determines if the engine speed is less than a first predetermined engine speed, monitors a barometric pressure, sets a throttle valve opening to a second predetermined throttle opening level, sets a throttle valve opening to a third predetermined throttle opening level after a predetermined time has elapsed from the setting of the second predetermined throttle opening level, determines if an engine speed is less than a second predetermined speed, sets a throttle valve opening to a fourth predetermined throttle opening level when the engine speed is less than the second predetermined speed, and the resting position of the piston is in a predefined piston position range.

In another embodiment of the present invention, the actuator control module estimates a remaining degrees of engine rotation when the piston is entering the predetermined position, and the remaining degrees of engine rotation estimation is based on the first predetermined engine speed and the barometric pressure.

In another embodiment of the present invention, the actuator control module maintains the throttle valve at first predetermined throttle opening level to further reduce pressure in the intake manifold.

In yet another embodiment of the present invention, the actuator control module maintains the throttle valve at a second predetermined throttle opening level to rapidly increase the pressure in the intake manifold.

In yet another embodiment of the present invention, the actuator control module maintains the throttle valve at a third predetermined throttle opening level to return the opening position to a position at or slightly above the position associated with an unpowered throttle actuator.

In yet another embodiment of the present invention, the actuator control module further comprises sets a predetermined fuel rail pressure.

In yet another embodiment of the present invention, the actuator control module further comprises monitors a barometric pressure.

In yet another embodiment of the present invention, the actuator control module further comprises estimates degrees of engine rotation before the engine stops rotating based on a speed of the engine, an engine deceleration and the barometric pressure.

In yet another embodiment of the present invention, the predetermined position is one of a predefined crankshaft rotational position.

In yet another embodiment of the present invention, the second predetermined throttle opening level is configured to raise the air pressure in at least one cylinder to approximately ambient barometric pressure.

In yet another embodiment of the present invention, the actuator control module further comprises sets a throttle valve opening to a fourth predetermined throttle opening level when the engine speed is about zero.

In a further embodiment of the present invention, an engine control method for controlling the resting position of at least one piston within a cylinder of an engine of an auto-stop/start vehicle includes, generating an auto-stop command for shutting down an engine while an ignition is in an ON state. The method also includes generating an auto-start command for re-starting the engine after the generation of the auto-stop command. The method also includes, disabling a load on the engine in response to the generation of the auto-stop command and before the generation of the auto-start command. The method also includes, parking exhaust cam phasers and intake cam phasers in response to the generation of the auto-stop command and before the generation of the auto-start command. The method also includes disabling fuel to the engine in response to the generation of the auto-stop command and before the generation of the auto-start command: setting a throttle valve opening to a first predetermined throttle opening level, monitoring a crankshaft rotational position, determining if a position of a piston is entering a predetermined position, monitoring a barometric pressure, setting a throttle valve opening to a second predetermined throttle opening level, setting a throttle valve opening to a third predetermined throttle opening level after a predetermined time has elapsed from the setting of the second predetermined throttle opening level, determining if an engine speed is less than a second predetermined speed, setting a throttle valve opening to a fourth predetermined throttle opening level when the engine speed is less than the second predetermined speed, and achieving a resting position of the piston that is in a predefined piston position range.

In a further embodiment of the present invention, the method includes estimating a remaining degrees of engine rotation when the piston is entering the predetermined position, and the remaining degrees of engine rotation estimation is based on the first predetermined engine speed and the barometric pressure.

In a further embodiment of the present invention, the method includes maintaining the throttle valve at the first predetermined throttle opening level further comprises maintaining the throttle valve at an opening level to further reduce pressure in the intake manifold.

In a further embodiment of the present invention, the method includes maintaining the throttle valve at the second predetermined throttle opening level further comprises maintaining the throttle valve at an opening level to rapidly increase the pressure in the intake manifold.

In a further embodiment of the present invention, the method includes maintaining the throttle valve at the third predetermined throttle opening level further comprises maintaining the throttle valve at an opening level to return the opening position to a position at or slightly above the position associated with an unpowered throttle actuator.

In a further embodiment of the present invention, the method includes setting a predetermined fuel rail pressure in response to the generation of the auto-stop command and before the generation of the auto-start command.

In a further embodiment of the present invention, the method includes monitoring a barometric pressure in response to the generation of the auto-stop command and before the generation of the auto-start command.

In a further embodiment of the present invention, the method includes estimating degrees of engine rotation before the engine stops rotating based on a speed of the engine, an engine deceleration and the barometric pressure.

In a further embodiment of the present invention, the method includes wherein the predetermined position is one of a predefined crankshaft rotational position.

In a further embodiment of the present invention, the method includes the predetermined position for the piston is entering an intake stroke.

In a further embodiment of the present invention, the method includes the second predetermined throttle opening level is configured to raise the air pressure in at least one cylinder to approximately ambient barometric pressure.

In a further embodiment of the present invention, the method includes setting a throttle valve opening to a fourth predetermined throttle opening level when the engine speed is approximately zero.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
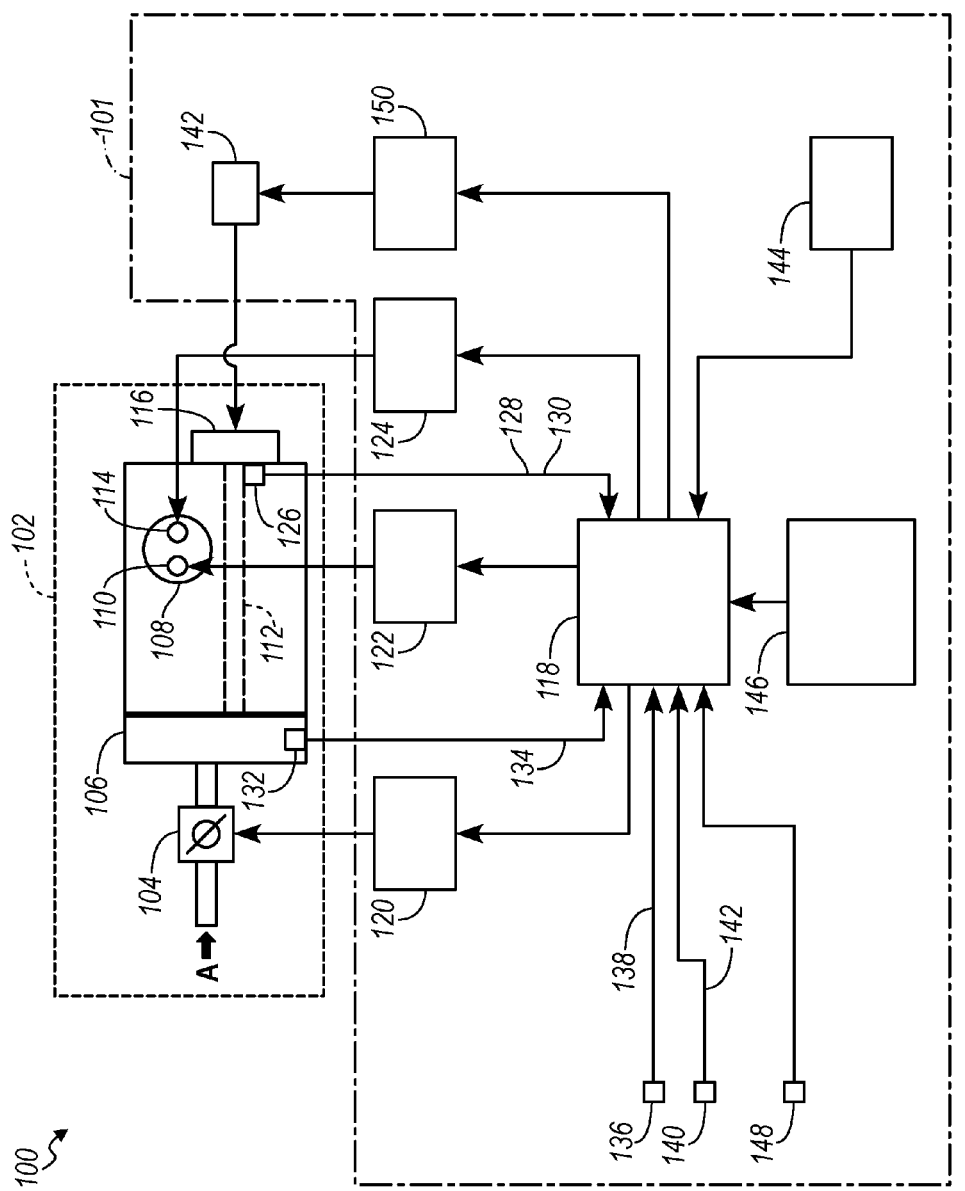
FIG. 1 is a functional block diagram of an exemplary engine system according to the principles of the present disclosure.

Referring now to FIG. 1, a functional block diagram of an exemplary engine system 100 is presented. Engine system 100 includes an engine 102 and an engine control system 101. The engine 102 generates drive torque for the vehicle. While the engine 102 is shown and will be discussed as a spark-combustion internal combustion engine (ICE), the engine 102 may include another suitable type of engine 102, such as a compression-combustion ICE. One or more electric motors (or motor-generators) may additionally generate drive torque. The engine control system 101 includes an engine control module (ECM) 118 that automatically shuts down the engine 102 when the engine 102 is idling to reduce fuel consumption and emissions and automatically shuts down the engine 102 when a driver depresses a brake pedal and the vehicle speed is zero. The engine control system 101 automatically restarts the engine 102 when the driver releases the brake pedal after the engine 102 is automatically shut down.

The engine 102 includes a throttle valve 104, an intake manifold 106, a cylinder 108, a fuel injector 110, a crankshaft 112, a spark plug 114, and a flywheel. Air, designated by arrow "A", is drawn into the engine 102 through the throttle valve 104 to the intake manifold 106. Airflow into the engine 102 is varied using the throttle valve 104. One or more fuel injectors, such as fuel injector 110, mix fuel with the air to form an air/fuel mixture. The air/fuel mixture is combusted within cylinders of the engine 102, such as cylinder 108. Although the engine 102 is depicted as including one cylinder 108, the engine 102 may include more than one cylinder 108.

The cylinder 108 includes a piston (not shown) that is mechanically linked to the crankshaft 112. One combustion cycle within the cylinder 108 includes four phases: an intake phase, a compression phase, a combustion (or expansion) phase, and an exhaust phase. During the intake phase, the piston moves toward a bottommost position and draws air into the cylinder 108. During the compression phase, the piston moves toward a topmost position and compresses the air or air/fuel mixture within the cylinder 108.

During the combustion phase, spark from the spark plug 114 ignites the air/fuel mixture. The combustion of the air/fuel mixture drives the piston toward the bottommost position, and the piston drives rotation of the crankshaft 112. Resulting exhaust gas is expelled from the cylinder 108 to complete the exhaust phase and the combustion event. The flywheel 116 is attached to and rotates with the crankshaft 112, and the engine 102 outputs torque to a transmission (not shown) via the crankshaft 112.

The ECM 118 receives data from and controls a plurality of components of engine system 101. The plurality of components of engine system 101 includes the throttle valve 104, the fuel injector 110, the spark plug 114, a throttle actuator module 120, a fuel actuator module 122, a spark actuator module 124, a crankshaft position sensor 126, a manifold absolute pressure (MAP) 132 sensor, an accelerator pedal position (APP) sensor 136, a brake pedal position (BPP) sensor 140, a transmission control module (TCM) 146, and an ignition system 148.

The ECM 118 controls the throttle valve 104 via the throttle actuator module 120, the ECM 118 controls the fuel injector 110 via a fuel actuator module 122, and the ECM controls the spark plug 114 via a spark actuator module 124. More specifically, the ECM 118 controls an opening area and opening duration of the throttle valve 104, a fuel injection amount and timing, and spark timing. While not shown, the ECM 118 may also control other engine actuators, such as one or more camshaft phasers, an exhaust gas recirculation (EGR) valve, a boost device (e.g., a turbocharger or a supercharger), and/or other suitable engine actuators.

The crankshaft position sensor 126 monitors rotation of the crankshaft 112 and outputs a crankshaft position signal 128 to the ECM 118 based on rotation of the crankshaft 112. The crankshaft position sensor 126 also measures direction of rotation of the crankshaft 112, and outputs a direction signal indicating the direction of rotation of the crankshaft 112, or the crankshaft position sensor 126 indicates the direction of rotation via the crankshaft position signal 128. The crankshaft position signal 128 is used, for example, to determine rotational speed of the crankshaft 112 (e.g., in revolutions per minute or RPM). The rotational speed of the crankshaft 112 is referred to as engine speed 130. The MAP 132 sensor measures pressure within the intake manifold 106 and generates a MAP signal 134 based on the pressure within the intake manifold 106.

The ECM 118 controls the torque output of the engine 102 based on one or more driver inputs, such as the accelerator pedal position, brake pedal position, and/or other suitable driver inputs. The APP sensor 136 measures position of an accelerator pedal (not shown) and generates an APP signal 138 based on the position of the accelerator pedal. The BPP sensor 140 measures position of a brake pedal (not shown) and generates a BPP signal 142 based on the position of the brake pedal.

The engine system 100 also includes one or more other sensors 144 (collectively illustrated as other sensors), such as a mass air flowrate (MAF) sensor, an intake air temperature (IAT) sensor, an engine coolant temperature sensor, an engine oil temperature sensor, and/or other suitable sensors. The ECM 118 also communicates with one or more other modules, such as the TCM 146.

A user inputs vehicle startup and vehicle shutdown commands to the ECM 118 via the ignition system 148 (collectively illustrated as ignition). In one aspect, the user inputs vehicle startup and vehicle shutdown commands by turning a key, pressing a button, or in another suitable manner. When the user has input a vehicle startup command and before a vehicle shutdown command has been received, the ignition system 148 is in an ON state. The ignition system 148 is in an OFF state when a vehicle shutdown command is input. A key cycle refers to a period between a first time when the user commands vehicle startup and a second time when the user commands vehicle shutdown. The ECM 118 selectively shuts down the engine 102 during a key cycle, (i.e., before a vehicle shutdown command is received) under some circumstances. An auto-stop event refers to shutting down the engine 102 during a key cycle. In one aspect, the ECM 118 selectively performs an auto-stop event during a key cycle when a user applies pressure to the brake pedal and/or when one or more other suitable conditions are satisfied. Shutting down the engine 102 under such conditions may decrease fuel consumption.

The ECM 118 selectively terminates the auto-stop event and restarts the engine 102. An auto-start event refers to starting the engine 102 after an auto-stop event during a key cycle. In one aspect, the ECM 118 performs an auto-start event when the user releases the pressure from the brake pedal, when the user applies pressure to the accelerator pedal, and/or when one or more other suitable conditions are satisfied.

Figure 2:
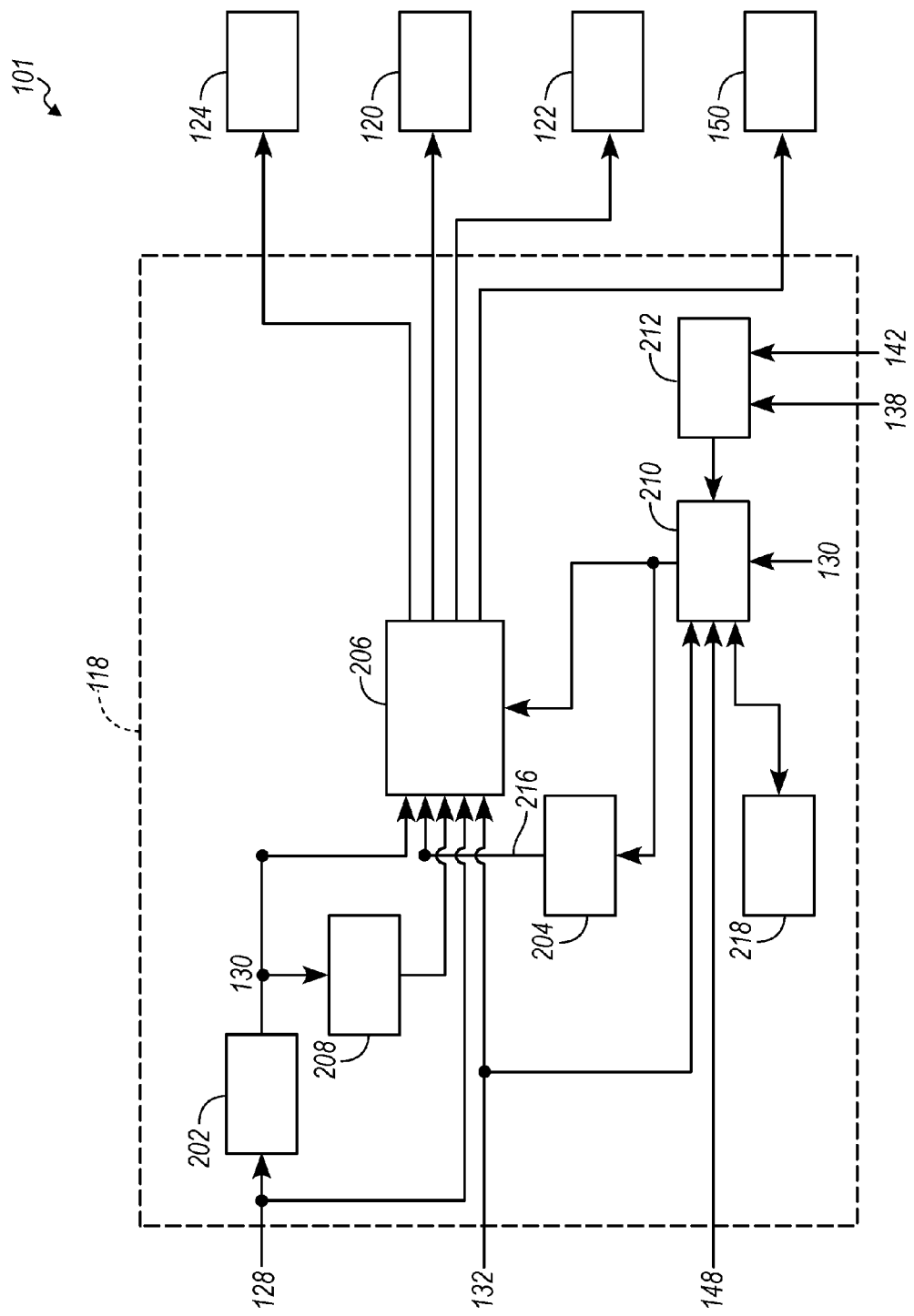
FIG. 2 is a functional block diagram of an exemplary engine control system according to the principles of the present disclosure.
Figure 3:
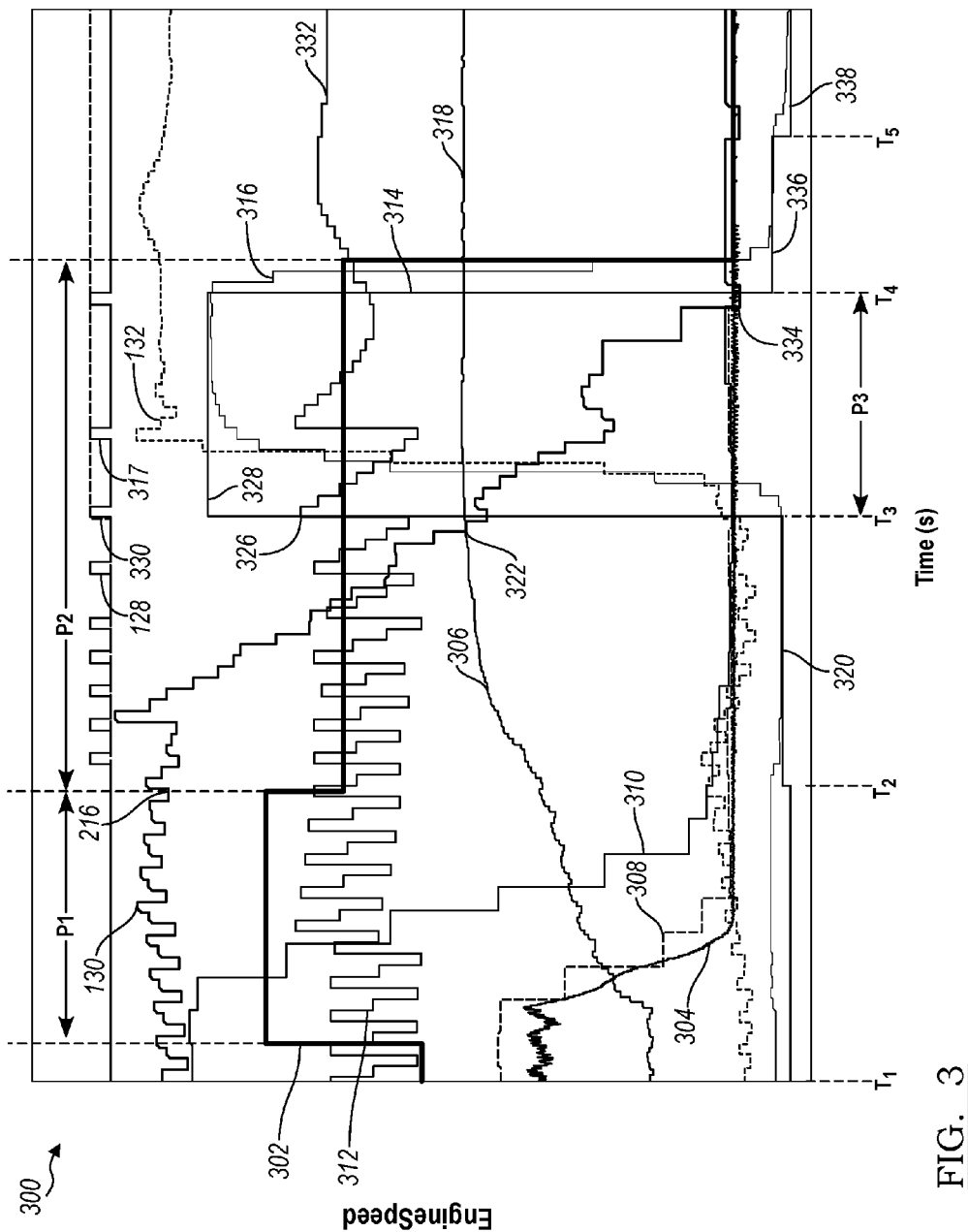
FIG. 3 is a graph of a plurality of engine data traces plotted as functions of time according to the principles of the present disclosure.
Figure 4:
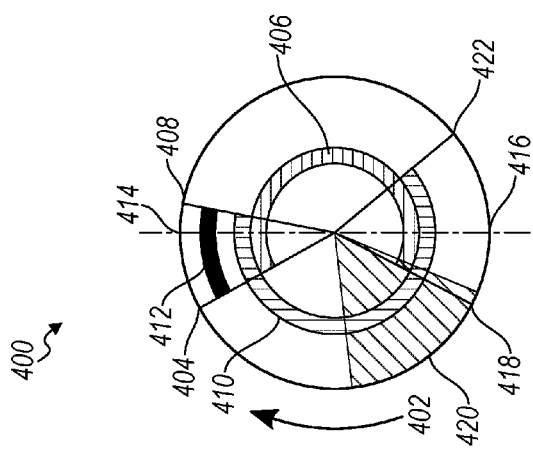
FIG. 4 is an exemplary crankshaft rotation diagram according to the principles of the present disclosure.

Referring now to FIGS. 2, 3, and 4, an exemplary engine control system 101 is presented. The engine control system 101 includes an ECM 118 and a plurality of sensors and modules. The ECM 118 includes an engine speed determination module 202, a target engine speed module 204, an actuator control module 206, an engine load estimation module 208, a throttle controller 210, and an auto-stop/start module 212. The ECM 118 also includes a spark timing adjustment module 124 that selectively adjusts spark timing to alter engine 102 torque outputs.

The engine speed determination module 202 determines the engine speed 130 based on the crankshaft position signal 128. In one aspect, the crankshaft position sensor 126 generates a high amplitude reading and a low amplitude reading. The crankshaft position sensor 126 produces a low amplitude reading until a specific condition is met. For example, the low amplitude reading of the crankshaft position sensor 126 is interrupted by the high amplitude reading when a tooth of an N-toothed wheel (e.g., the flywheel 116) passes the crankshaft position sensor 126. For a further example, a target angle crossing pulse 317 is generated as the crankshaft 112 rotates past a predetermined position (for example, TDC 414) for a cylinder 108 of the engine 102. The engine speed determination module 202 determines the engine speed 130 based on a period between two or more teeth of the N-toothed wheel. The engine speed determination module 202 also determines the engine rate of deceleration based on a time interval between two or more of the target angle crossing pulses 317.

To determine the engine rate of deceleration, the ECM 118 relies upon derivation of angular rotational speed and acceleration of the crankshaft 112 using equations of angular motion for a system undergoing constant angular acceleration. A summary of the relevant equations follows.

$$\omega f^2 = \omega^2 + 2 \cdot \alpha \cdot \Delta\theta \quad (600)$$

In equation (600), $\omega x$=angular speed of the crankshaft 112 in radians/second at a particular point in time x, $\alpha$ is the angular acceleration in radians/second$^2$ of the crankshaft 112, and $\Delta\theta$ is angular displacement of the crankshaft 112 in radians during a time interval between a first time to and a second time $t_f$. When crankshaft 112 ceases to rotate and the engine speed 130 drops to zero, $\omega f=0$ radians/second and equation 600 becomes:

$$0 = \omega_0^2 + 2 \cdot \alpha \cdot \Delta\theta \quad (602).$$

Rearranging, equation 602 becomes:

$$\Delta\theta = \frac{\omega_0^2}{(2 \cdot |\alpha|)}. \quad (604)$$

That is, $\Delta\theta$ represents the estimated change in rotational position (angular position) of the crankshaft 112 between the current pulse 317 and when the engine speed 130 becomes zero. The $\omega$ represents the angular speed of the crankshaft 112 at a particular point in time, and $|\alpha|$ represents the absolute value of the angular acceleration of the crankshaft 112. In an exemplary case in which the ECM 118 has initiated an auto-stop, because the engine 102 is decelerating, the angular acceleration of the crankshaft 112 has a negative value. To convert the equation 604 into degrees, rather than radians, a series of substitutions may be made.

$$\omega\left(\frac{\text{rad}}{\text{sec}}\right) = rpm \cdot \left(\frac{2\pi}{60}\right) \quad (606)$$

$$\Delta\theta(\text{rad}) = \Delta Deg \cdot \left(\frac{2\pi}{360}\right) \quad (608)$$

$$\alpha\left(\frac{\text{rad}}{\text{sec}^2}\right) = \frac{\Delta rpm}{\text{sec}} \cdot \left(\frac{2\pi}{60}\right) \quad (610)$$

In one aspect, the ECM 118 uses the time intervals between pulses 317 to form the foundation of an event-based approach to update the angular displacement estimate. That is, the ECM 118 updates co on an event basis. For instance, the event may occur at each crossing of a predetermined crankshaft 112 angle $\theta$ relative to a predetermined crankshaft 112 rotational position such as TDC 414 for a particular cylinder 108.

The angular acceleration a is calculated as the change in the event-based angular speed of the crankshaft 112 over the time between the prior event sample (n−1) and the current event sample (n), where n represents the current update event value(s) and n−1 represents the prior update event value(s).

$$\alpha[n] = \frac{\{\omega[n] - \omega[n-1]\}}{\{t[n] - t[n-1]\}} \quad (612)$$

The ECM 118 uses the target engine speed 216 to determine when to instruct the throttle controller 210 to command specific throttle valve 104 areas during an engine 102 auto-stop. The target engine speed module 204 determines the target engine speed 216 based on barometric pressure. In one aspect, because engine 102 pumping losses decrease with decreased barometric pressure, the target engine speed module 204 will set a target engine speed 216 at ten thousand feet of altitude that is a lower target engine speed 216 than the target engine speed module 204 would set at sea level. In the ten thousand foot example above, because the engine 102 pumping losses are decreased relative to the pumping losses in an engine 102 at sea level, the number of crankshaft 112 revolutions before the engine 102 stops will be greater than the number of crankshaft 112 revolutions before engine stop of the same engine 102 at sea level. Therefore, to reliably predict engine stop position, the target engine speed module 204 alters the target engine speed 216 based in part on barometric pressure.

With continued reference to FIG. 3, exemplary graphs of alternator load, fuel pressure, intake and exhaust cam phasers, MAP 132, throttle area, and engine position as functions of time are presented. Exemplary trace 302 tracks auto-stop pre-conditioning and fuel shut-off. Exemplary trace 304 tracks the engine alternator load. Exemplary trace 306 tracks the fuel pressure. Exemplary trace 308 tracks the exhaust cam phaser position. Exemplary trace 310 tracks the intake cam phaser position. Exemplary trace 130 tracks the engine speed. Exemplary trace 312 tracks engine position. Exemplary trace 128 tracks the target angle crossing pulse 317 events. Exemplary trace 132 tracks the MAP. Exemplary trace 316 tracks the actual throttle area. Exemplary trace 314 tracks the desired throttle area.

Figure 5:
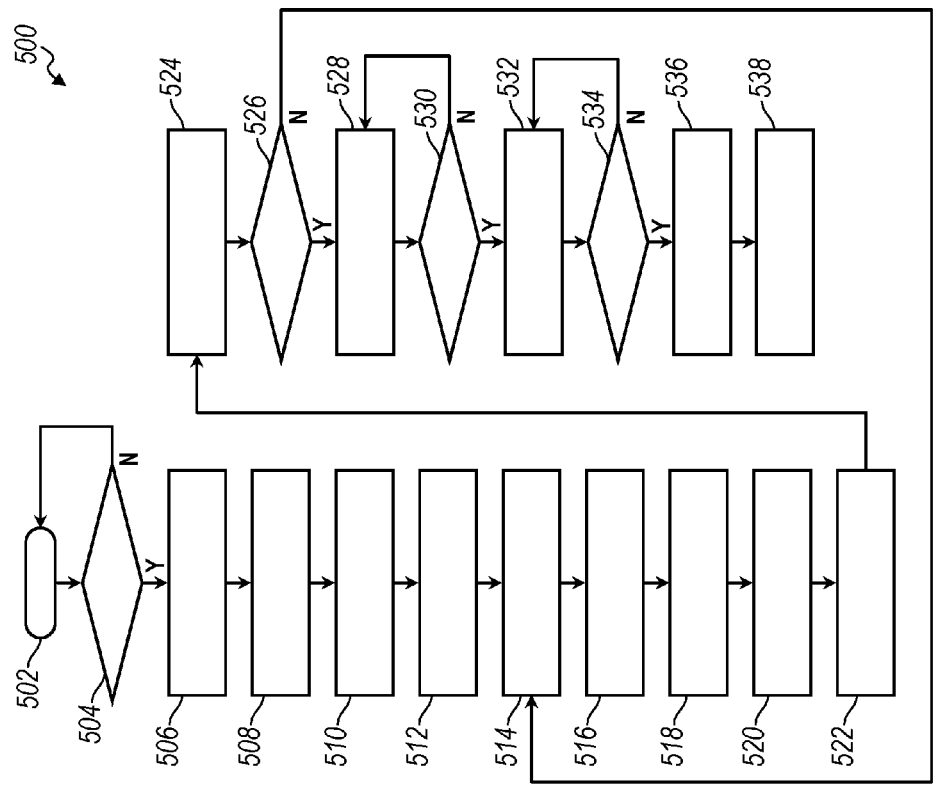
FIG. 5 is a flowchart depicting an exemplary method of controlling the MAP according to the principles of the present disclosure.

With reference to FIG. 5, and with additional reference to FIGS. 2, 3 and 4, in one aspect, the engine control system 101 has an exemplary auto-stop sequence 500 that begins at block 502 and proceeds to block 504 where the ECM 118 determines whether an auto-stop event has been commanded during a key cycle. If the auto stop event has not been commanded, the method returns to block 502. However, if an auto-stop has been commanded, the method proceeds to block 504, where the method enters a pre-conditioning period $P_1$ from time $T_1$ to time $T_2$. During the pre-conditioning period $P_1$, the ECM 118 first commands the actuator control module 206 to reduce a load on the engine 102 at block 506 by disabling the alternator to reduce an alternator load 304 and disabling the A/C clutch to reduce an A/C load (not shown). Decreasing the load on the engine 102 improves the accuracy of load estimations generated by the engine load estimation module 208. The method then proceeds to block 508, where the ECM 118 parks the exhaust cam phaser 308 at a predetermined timing position and the ECM parks the intake cam phaser 310 at a predetermined timing position in preparation for the engine 102 to shut down. At block 510, the ECM 118 increases a fuel rail pressure 306 to a predetermined target fuel pressure 318, at which point the ECM 118 disables the engine fuel supply at time $T_2$ at block 512. Once the engine fuel supply has been disabled, the auto-stop sequence enters the shut-down period $P_2$.

During the shut-down period $P_2$, from time $T_2$ to time $T_4$, the engine 102 shuts off. In the shut-down period $P_2$ from $T_2$ to $T_4$, the fuel rail pressure 306 continues to increase to the predetermined target fuel pressure 318. At block 514, the ECM 118 sets the desired throttle area 314 of the throttle valve 104 to a first predetermined throttle opening 320. The first predetermined throttle opening 320 reduces the MAP 132 and thus, reduces the trapped pressure in the cylinder 108 or cylinders 108 entering the intake phase. In one aspect, the first predetermined throttle opening 320 includes a predetermined idle throttle opening or another suitable throttle opening. Setting desired throttle area 314 to the first predetermined throttle opening 320 chokes the engine 102 and minimizes shudder. Shudder refers to vibration experienced within the passenger cabin as the engine speed approaches zero.

During the auto-stop sequence, and during the shut-down phase after time $T_2$ in particular, the ECM 118 monitors a plurality of conditions. The plurality of conditions that the ECM 118 monitors includes crankshaft position 128 data at block 516, engine speed 130 data at block 518, barometric pressure at block 520, engine deceleration data at block 522, and at block 524 the ECM 118 estimates the remaining degrees of engine rotation prior to a predetermined engine stop position 332. In one aspect, the predetermined engine stop position 332 for an exemplary piston 400 is within a target auto-stop range 420.

With further reference to FIG. 4, a rotational diagram of a combustion cycle for a first cylinder 400 in an exemplary four-stroke four-cylinder engine in terms of crankshaft 112 position is presented. The cylinders 108 of the exemplary four-stroke four-cylinder engine have the firing order 1-3-4-2, repeating. For the purposes of the following explanation, the first cylinder 400 refers to cylinder #1 in the exemplary four-stroke four-cylinder engine. However, the cylinder 400 may be any of the four cylinders in the exemplary four-stroke four-cylinder engine.

The crankshaft 112 rotates in a clockwise direction as indicated by reference number 402. A portion of the combustion cycle of the first cylinder 400 includes an intake valve opening event 404, an intake valve duration 406, an exhaust valve closing event 408, an exhaust valve duration 410, a valve overlap duration 412, TDC 414, a bottom dead center (BDC) position 416, an intake valve closing event 418, and a target auto-stop range 420.

For the first cylinder 400 of the exemplary four-stroke four-cylinder engine to complete a full combustion cycle, and return to the same point in the combustion cycle, two full revolutions of the crankshaft 112 are required. An exemplary combustion cycle for the first cylinder 400 begins with the intake phase in which there is an intake valve opening event at 404. The period during which the intake valve is open is referred to as the intake valve duration 406. As the intake valve opening event occurs at 404, an exhaust valve closing event 408 has not yet occurred. The period during which the exhaust valve is open is referred to as the exhaust valve duration 410. Thus the intake valve duration 406 and the exhaust valve duration 410 may overlap within a portion of the combustion cycle. The portion of the combustion cycle in which both the intake valve and exhaust valve are open is referred to as the valve overlap duration 412 of the first cylinder 400. The valve overlap duration 412 occurs near TDC 414. The intake valve overlap duration 406 can vary substantially depending on intake cam phaser 310 timing setting and the exhaust cam phaser 308 timing setting. The valve overlap duration 412 can also vary substantially between engines 102. Fresh air "A" is drawn into the engine 102 during the intake phase. In one aspect, the intake valve remains open for a duration 406 that extends to an intake valve closing event 418 that is beyond bottom dead center (BDC) 416. Because of the previously mentioned 1-3-4-2 firing order, when the exemplary first cylinder 400 is in the intake phase and is next in sequence to enter the compression phase, an exemplary third cylinder (cylinder #3, not shown) is in the exhaust phase and is next in sequence to begin the intake phase. Likewise an exemplary second cylinder (cylinder #2, not shown) is in the compression phase and is next in sequence to enter the expansion phase, and an exemplary fourth cylinder (cylinder #4, not shown) is in the expansion phase and is next in sequence to enter the exhaust phase. During the exhaust phase of the first cylinder 400, the third cylinder is in the expansion phase. Thus, the first cylinder 400 and third cylinder of the exemplary four-stroke four-cylinder engine are always 180° rotationally offset from one another. Likewise, the second cylinder and fourth cylinder of the exemplary four-stroke four-cylinder engine are always 180° rotationally offset from one another.

Referring once again to the first cylinder 400, after completing the intake phase, the first cylinder 400 then enters the compression phase. During the compression phase, the intake valve closing event 418 occurs, and the pressure of the trapped air mixture rises as first cylinder 400 approaches TDC 414. As the compression phase of the first cylinder 400 is completed, the first cylinder 400 transitions to the expansion phase with both the intake and exhaust valves remaining closed. While the first cylinder 400 is engaged in the compression phase, the third cylinder is engaged in the intake phase. After the first cylinder 400 completes the expansion phase, an exhaust valve opening event 422 occurs, and the exhaust valve remains open for the exhaust valve duration 410. The first cylinder 400 then re-enters the intake phase in which the intake valve opening event 404 and overlap 412 occur.

With continued reference to FIG. 4, and with further reference to FIGS. 2, 3, and 5, after time $T_2$, because the engine fuel supply and spark have been disabled, and because the first predetermined throttle opening 320 reduces the MAP 132 and chokes the engine 102 by reducing the airflow "A" to the intake manifold 104, the engine speed 130 decreases toward zero as no torque is being produced by the engine 102. At block 526 the ECM determines whether the engine speed determination module 202 data indicates that the engine speed 130 has decreased to a first predetermined engine speed threshold 322. Furthermore, at block 526, the crankshaft position sensor 128 generates the target angle crossing pulse 317 as each cylinder 108 crosses a predetermined engine position (e.g., TDC 414) relative to the intake phase. From the pulse 317, the ECM 118 determines whether the engine 102 has reached a predetermined threshold engine position crossing threshold 326 that indicates the engine 102 will stop with a cylinder 108 within the target engine stop range 420. If each of the engine speed threshold 322, remaining rotation threshold (not shown), and engine position crossing threshold 326 have been met, the method proceeds to block 528. If the predetermined engine speed threshold 322, remaining rotation threshold (not shown), and engine position crossing threshold 326 have not been met, the method reverts to block 516, and begins monitoring the crankshaft position, engine speed 130, barometric pressure, engine rate of deceleration, and the ECM 118 estimates remaining degrees of engine rotation again.

At block 528, if the engine 102 in an auto-stop sequence has reached the shut-down phase, and target angle crossing pulse 317 is generated, the ECM 118 commands the second predetermined throttle opening if the engine speed 130, and crankshaft position signal 128 allow the ECM 118 to determine that the remaining degrees of rotation will put a cylinder 108 into the target auto-stop position range 420.

To determine the second predetermined throttle opening 328 and predetermined period $P_3$, the ECM 118 uses the crankshaft position signal 128, engine speed 130, and barometric pressure. In one aspect of the present invention, the ECM 118 also uses an estimate of the number of degrees of rotation remaining before the engine 102 stops to predict the engine stop position 332. The estimate of degrees of rotation remaining is accomplished by using the engine speed 130 to calculate a rate of angular deceleration (using equation 612 above) at each target angle crossing pulse 317. Using the unit conversions and simplifying the equations previously discussed, the engine stop position 332 may be predicted by the following remaining degrees of rotation equation 614.

$$\Delta Deg[n] = \frac{3 \cdot (rpm[n] \cdot rpm[n]) \cdot (t[n] - t[n-1])}{(rpm[n-1] - rpm[n])} \quad (614)$$

In an aspect of the present invention, the second predetermined throttle position 328 is applied once the engine crankshaft position 128 has crossed a predetermined threshold crankshaft position 330, and the engine speed 130 is below the engine speed threshold 322 for a particular ambient barometric pressure as determined from a lookup table. The engine speed threshold 322 in the lookup table is a function of barometric pressure, and correlates to a target auto-stop range 420 that reduces the level of auto-stop and auto-start vibration. Therefore, when the ECM 118 uses the barometric pressure at sea-level to calculate the engine speed threshold 322, the reliability of the engine speed threshold 322 to stop the engine 102 in the target auto-stop range 420 decreases as the difference between the barometric pressure at sea-level and the actual barometric pressure increases.

Referring once more to the previous example of a four-stroke four-cylinder engine with the first piston 400, in FIG. 3, as the auto-stop period $P_2$ progresses past time $T_3$, the ECM 118 selects a specific cylinder (in this example, the first cylinder 400) for which each of the shutdown threshold criteria: predetermined threshold crankshaft position 330, engine speed threshold 322, and/or estimated remaining degrees of rotation threshold have been achieved. The ECM 118 then uses the first cylinder 400 for triggering the second predetermined throttle opening 328 that will control an engine stop position 332, and more specifically, that will control a stop position of the first cylinder 400. If at time $T_3$, when shutdown threshold criteria have been achieved for the first cylinder 400, and the ECM 118 instead uses a different cylinder 108, such as the previously-described second, third, or fourth cylinder, to initiate the second predetermined throttle opening 328, the target auto-stop range 420 may not be achieved. For a further example, in the case where the ECM 118 targets the second cylinder, which in the exemplary engine precedes the first cylinder 400 in the firing order, the engine speed 130 is higher than the engine speed threshold 322 for the first cylinder 400 for which all of the threshold criteria have been met. In the example, when the engine speed 130 is higher than the engine speed threshold 322 for the first cylinder 400, the engine 102 will exceed the target auto-stop range 420 and engine position 332. When the target auto-stop range 420 is not achieved, undesirable noise, vibration, and harshness result during auto-stop and auto-start events.

Using equation 614, the ECM 118 commands the second predetermined throttle opening 328, where the second predetermined throttle opening 328 is greater than the first predetermined throttle opening 320 and includes any single opening or plurality of suitable openings that allow the MAP 132 to rapidly increase toward barometric pressure while also reducing throttle valve 104 audible noise. By rapidly increasing the MAP 132, pressure in the intake manifold 106 and in one or more cylinders 108 that are in sequence to enter the intake phase is also increased.

In the example above, because the exhaust cam phaser and intake cam phaser 308, 310 are parked prior to the ECM 118 commanding the second predetermined throttle opening 332, the intake valve and the exhaust valve of the cylinder in the compression stroke and the cylinder in the expansion stroke (e.g., the first cylinder 400 and the second cylinder respectively) are closed as the engine 102 slows to a momentary stop 334, and the first cylinder 400 reaches the target auto-stop range 420. Furthermore, because the second predetermined throttle opening 328 rapidly increases air pressure within the intake manifold 106 and the first cylinder 400 in the intake phase, as the first cylinder 400 completes the intake phase and undergoes the compression phase, the first cylinder 400 stops momentarily at or near TDC 414. When the first cylinder 108 stops at or near TDC 414, movement of the crankshaft 112 is momentarily reversed due to trapped pressure in the cylinders. This reversal of crankshaft 112 movement during engine 102 shutdown is referred to as rock back. As the crankshaft 112 rocks back, air pressure within the next cylinder 108 in the firing order (e.g., the third cylinder, relative to the exemplary first cylinder 400) tends to approach barometric pressure and comes to rest on the compression stroke in the target auto-stop range 420. When the MAP 132 and the exemplary third cylinder pressures approach barometric pressure, less exhaust gas is present in the intake manifold 106 and the third cylinder, and the potential for a misfire is reduced when the engine 102 is restarted. Engine vibration may be prevented when the engine 102 is restarted by preventing misfires.

Referring once more to FIG. 5, and with continuing reference to FIGS. 1, 2, 3, and 4, at block 530, the ECM 118 determines whether the predetermined time period $P_3$, has been met. At $T_4$, the ECM 118 sets a third predetermined throttle opening 336 at block 532 that is equal to or slightly above or slightly below the first throttle predetermined opening 320. In part, because there is a lag between the desired throttle area 314 and the actual throttle area 316, in one aspect, the second predetermined throttle opening 328 holding period $P_3$ may extend beyond $T_4$. Additionally, because the first predetermined throttle opening 320 chokes the engine 102 and because the second predetermined throttle opening 328 pressurizes the intake manifold 106 and at least one cylinder 108, the desired and actual throttle areas 314, 316 further cause the engine speed 130 to decrease and eventually arrest rotation of the engine 102.

The throttle controller 210 also provides throttle valve 104 position commands to the actuator control module 206 under a variety of conditions. In one aspect, during the holding period $P_3$ of the second predetermined throttle opening 328, the throttle controller 210 starts a timer in a timer module 218. The timer in the timer module 218 tracks the duration of the holding period $P_3$ since the second predetermined throttle opening 328 was set. During the holding period $P_3$, the throttle controller 210 selectively varies the desired throttle area 314 to follow a predetermined throttle opening profile, when the timer is less than the predetermined holding period $P_3$. In one aspect, the throttle controller 210 transitions the desired throttle area 314 to the third predetermined throttle opening 336 when the auto-stop/start module 212 generates an auto-start command. When the auto-start command is generated, the actuator control module 206 commands a starter actuator module 150 to activate the ignition 148 and thereby start the engine 102. In this manner, if the engine 102 should be auto-started when the second predetermined throttle opening 328 has been set for less than the full extent of the holding period $P_3$, the engine 102 is started without the throttle valve 104 at or near a desired throttle opening.

At block 534, the ECM 118 determines whether the engine 102 has stopped rotating. If the engine speed determination module 202 has determined that the engine speed 130 is approximately zero, the ECM 118 commands a fourth predetermined throttle opening 338 starting at time $T_5$ at block 536. The fourth predetermined throttle opening 338 is for example, at a level that is higher than, the same as, or lower than the third throttle opening. At block 538, the auto-stop method ends.

While the principles of the present disclosure are discussed as relating to adjusting spark-ignition engines, the principles of the present disclosure are also applicable to adjusting fuel injection timing in compression-combustion engines. In one aspect, the fuel injection timing is adjusted based on an injection timing correction that is determined based on the difference between the target engine speed 216 and the engine speed in compression-combustion engine systems. The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for controlling a resting position of at least one piston within a cylinder of an engine of an auto-stop/start vehicle, the system comprising:
   an auto-stop/start module that selectively generates an auto-stop command for shutting down an engine while an ignition is in an ON state and that selectively generates an auto-start command for re-starting the engine after the generation of the auto-stop command; and
   an actuator control module that, in response to the generation of the auto-stop command and before the generation of the auto-start command:
   disables a load on the engine;
   parks exhaust cam phasers and intake cam phasers;
   disables fuel to the engine;
   sets a throttle valve opening to a first predetermined throttle opening level;
   monitors a crankshaft rotational position;
   determines if a position of a piston is entering a predetermined position based on the crankshaft rotational position;
   monitors an engine speed;
   monitors a barometric pressure;
   determines an engine speed threshold as a function of the barometric pressure;
   estimates degrees of engine rotation before the engine stops rotating based on the engine speed, an engine deceleration and the barometric pressure;
   determines if the engine speed is less than the engine speed threshold;
   sets a throttle valve opening to a second predetermined throttle opening level;
   sets a throttle valve opening to a third predetermined throttle opening level after a predetermined time has elapsed from the setting of the second predetermined throttle opening level;
   determines if the engine speed is less than a second predetermined engine speed;
   sets a throttle valve opening to a fourth predetermined throttle opening level when the engine speed is less than the second predetermined speed; and
   whereby the resting position of the piston is in a predefined piston position range.

2. The engine control system of claim 1 wherein the actuator control module estimates a remaining degrees of engine rotation when the piston is entering the predetermined position, wherein the remaining degrees of engine rotation estimation is based on the engine speed and the barometric pressure.

3. The engine control system of claim 1 wherein the actuator control module maintains the throttle valve at a first predetermined throttle opening level to further reduce pressure in the intake manifold.

4. The engine control system of claim 3 wherein the actuator control module maintains the throttle valve at a second predetermined throttle opening level to rapidly increase the pressure in the intake manifold.

5. The engine control system of claim 1 wherein the actuator control module maintains the throttle valve at a third predetermined throttle opening level to return the opening position to a position at or slightly above the position associated with an unpowered throttle actuator.

6. The engine control system of claim 1 wherein the actuator control module further comprises sets a predetermined fuel rail pressure.

7. The engine control system of claim 1 wherein the predetermined position is one of a predefined crankshaft rotational position.

8. The engine control system of claim 7 wherein the second predetermined throttle opening level is configured to raise the air pressure in at least one cylinder to approximately ambient barometric pressure.

9. The engine control system of claim 1 wherein the actuator control module further comprises sets a throttle valve opening to a fourth predetermined throttle opening level when the engine speed is about zero.

10. An engine control method for controlling a resting position of at least one piston within a cylinder of an engine of an auto-stop/start vehicle, the method comprising:
    generating an auto-stop command for shutting down an engine while an ignition is in an ON state;
    generating an auto-start command for re-starting the engine after the generation of the auto-stop command;
    disabling a load on the engine in response to the generation of the auto-stop command and before the generation of the auto-start command;
    parking exhaust cam phasers and intake cam phasers in response to the generation of the auto-stop command and before the generation of the auto-start command;
    disabling fuel to the engine in response to the generation of the auto-stop command and before the generation of the auto-start command;

setting a throttle valve opening to a first predetermined throttle opening level;
monitoring a crankshaft rotational position;
determining if a position of a piston is entering a predetermined position based on the crankshaft rotational position;
monitoring an engine speed monitoring a barometric pressure in response to the generation of the auto-stop command and before the generation of the auto-start command;
determining an engine speed threshold as a function of the barometric pressure;
estimating degrees of engine rotation before the engine stops rotating based on the engine speed, an engine deceleration and the barometric pressure;
determining if the engine speed is less than the engine speed threshold;
setting a throttle valve opening to a second predetermined throttle opening level;
setting a throttle valve opening to a third predetermined throttle opening level after a predetermined time has elapsed from the setting of the second predetermined throttle opening level;
determining if an engine speed is less than a second predetermined speed;
setting a throttle valve opening to a fourth predetermined throttle opening level when the engine speed is less than the second predetermined speed; and
whereby the resting position of the piston is in a predefined piston position range.

11. The engine control method of claim 10 wherein controlling the resting position of at least one piston further comprises estimating a remaining degrees of engine rotation when the piston is entering the predetermined position, wherein the remaining degrees of engine rotation estimation is based on the engine speed and the barometric pressure.

12. The engine control method of claim 10 wherein maintaining the throttle valve at the first predetermined throttle opening level further comprises maintaining the throttle valve at an opening level to further reduce pressure in the intake manifold.

13. The engine control method of claim 12 wherein maintaining the throttle valve at the second predetermined throttle opening level further comprises maintaining the throttle valve at an opening level to rapidly increase the pressure in the intake manifold.

14. The engine control method of claim 10 wherein maintaining the throttle valve at the third predetermined throttle opening level further comprises maintaining the throttle valve at an opening level to return the opening position to a position at or slightly above the position associated with an unpowered throttle actuator.

15. The engine control method of claim 10 further comprising setting a predetermined fuel rail pressure in response to the generation of the auto-stop command and before the generation of the auto-start command.

16. The engine control method of claim 10 wherein the predetermined position is one of a predefined crankshaft rotational position.

17. The engine control method of claim 16 wherein the predetermined position for the piston is entering an intake stroke.

18. The engine control method of claim 16 wherein the second predetermined throttle opening level is configured to raise the air pressure in at least one cylinder to approximately ambient barometric pressure.

19. The engine control method of claim 10 further comprising setting a throttle valve opening to a fourth predetermined throttle opening level when the engine speed is approximately zero.

* * * * *